3,114,781
ALKYLATION OF AROMATIC COMPOUNDS
Hugh Wilma Boulton Reed, Norton-on-Tees, England, assignor to Imperial Chemical Industries Limited, London, England, a corporation of Great Britain
No Drawing. Filed Dec. 14, 1959, Ser. No. 859,143
Claims priority, application Great Britain Dec. 23, 1958
16 Claims. (Cl. 260—671)

This invention relates to the alkylation of aromatic compounds.

Processes for the alkylation of aromatic compounds using catalysts such as aluminum trichloride/hydrogen chloride or boron trifluoride are known. However, the known catalysts which give a reasonably high rate of alkylation usually act also as isomerisation catalysts. For example, the alkylation of benzene or a mono-alkyl substituted benzene such as toluene using an active alkylation catalyst yields a high proportion of the meta isomer in the di-substituted benzene product. These meta di-substituted benzenes e.g. meta-xylene, meta-cymene and meta-diisopropylbenzene are of much less commercial importance than the corresponding ortho- and para-compounds.

We have now found that a very suitable catalyst for the alkylation of aromatic compounds is a titanium trihalide or a product obtained by reacting aluminum with a titanium tetrahalide. We have further found that the catalyst of the invention promote a high rate of alkylation and yet in the alkylation of benzene and mono-substituted benzenes such as toluene the proportion of meta-disubstituted benzene formed is much less than that produced when using the known active alkylation catalysts.

According to the present invention, therefore, there is provided a process for the alkylation of aromatic compounds in which the aromatic compound is brought into contact with an alkylating agent in the presence of a catalyst comprising a titanium trihalide or a product obtained by reacting aluminum with a titanium tetrahalide.

The titanium trihalide is preferably titanium trichloride.

The product obtained by reacting aluminum with a titanium tetrahalide should preferably be produced at temperatures not exceeding 250° C., preferably at temperatures within the range 100° C. to 200° C. and more preferably at the boiling point of the titanium tetrahalide under atmospheric pressure. The titanium tetrahalide preferably titanium tetrachloride, should preferably be in excess of the amount required to react completely wtih the aluminum in order to avoid contamination of the reaction product by metallic aluminum. The aluminum is preferably used in finely divided form. The reaction which may be carried out in the presence of an inert diluent e.g. a liquid hydrocarbon, should preferably be conducted under reflux conditions in order to facilitate removal of the heat of reaction.

The reaction between aluminum and a titanium tetrahalide is preferably carried out in the presence of aluminum trichloride particularly freshly sublimed aluminum trichloride, or more preferably boron trichloride. After completion of the reaction excess titanium tetrahalide should preferably be removed from the reaction product. This may be accomplished by direct distillation or if the reaction has been carried out in the presence of boron trichloride, by adding an inert diluent e.g., a hydrocarbon such as metal cyclohexane or petroleum ether (100–120° C.) to the reaction mixture, filtering off the solid aluminum-titanium tetrahalide reaction product and recovering unchanged titanium tetrahalide from the filtrate by distillation.

The pressure under which the titanium tetrahalide is reacted with aluminum should be at least sufficient to maintain the titanium tetrahalide and the inert diluent, if used, in the liquid phase.

The product of the reaction between aluminum and for example titanium tetrachloride has a composition which may vary but in general it approximates to an atomic ratio Al:Ti:Cl of 1:3:12. It has a characteristic X-ray diffraction pattern. Nuclear magnetic resonance measurements indicate that it does not contain aluminum trichloride.

The alkylation process of the invention is preferably operated at moderately elevated temperature, e.g. 70° to 100° C. It may be operated at atmospheric or moderately elevated pressure, in the presence or absence of an inert diluent.

It is preferred that the alkylating agent is an olefine particularly ethylene, propylene, butene-1 and butene-2. Other alkylating agents e.g. alkyl halides may however be used.

The titanium trihalide or the reaction product of aluminum and a titanium tetrahalide may be comminuted in for example, a ball-mill before use in the alkylation process. The comminution may be carried out on the dry material or in the presence of an inert liquid such as benzene. The proportion of catalyst used in the alkylation method may be carried between wide limits, and the reaction is preferably performed under substantially anhydrous conditions.

After completion of the alkylation process the catalyst may be separated from the reaction product by for example, filtration and the alkylate recovered by distillation.

The process of the invention is particularly suitable in the propylation of toluene to give ortho- and para-cymene which may then be oxidised to the corresponding di-carboxylic acids.

Details of examples of alkylation processes according to the present invention are given in Tables 1 to 4 following. Table 5 includes examples of alkylation processes using known catalysts for comparative purposes.

In each of the examples in Tables 1, 2, 3 and 5, propylene was passed into a stirred suspension of the catalyst in the aromatic compound maintained at the temperature indicated until the indicated quantity of propylene was absorbed. The catalyst comprising the reaction product of aluminium with titanium tetrachloride was obtained in the following way:

10 gms. aluminium powder and 10 gms. freshly sublimed aluminium chloride were added to 500 cc. titanium tetrachloride under an atmosphere of nitrogen. The mixture was stirred and the temperature gradually raised to about 130° C. when a vigorous reaction commenced. Heating was then discontinued until the rate of reaction moderated and the reaction mixture was then heated under reflux for 17 hours. The excess titanium tetrachloride together with free aluminium trichloride was distilled off at atmospheric pressure and the residual solid heated at 200° C. under 0.2 mm. Hg absolute pressure for 5 hours to remove any remaining titanium tetrachloride. 174 gm. of a pale purple solid were obtained which analysis showed to contain 23.61% titanium, 5.23% aluminium and 68.85% chlorine. The Debye-Scherrer X-ray diffraction pattern of the solid was determined. Lines were identified corresponding to interplanar spacings of 5.87, 5.23, 5.03, 4.49, 2.99, 2.91, 2.87, 2.69, 2.503, 2.106, 1.939, 1.885, 1.782, 1.761, 1.684, 1.641, 1.507, 1.464, 1.441, 1.255, 1.171, 1.128, 1.117, 1.019, 1.006, 0.996, 0.997 and 0.963 Angstrom units. The error in measurement was estimated to be ±0.06 A. at a spacing of 5.03 A. and ±0.002 A. at a spacing of 1.441 A.

The catalyst for Examples 15 and 16 was comminuted in a ball mill before use.

In Examples 17 and 18, given in Table 3, cumene was alkylated with propylene, using as catalyst the aluminium-titanium tetrachloride reduction product prepared as described.

In Examples 19 and 20, given in Table 4, the alkylating agent indicated was slowly added to a stirred suspension of the catalyst in the toluene.

Examples 21 to 26 which appear in Table 5 are provided for purposes of comparison with the preceding examples according to the invention.

In the tables, the symbol Al—TiCl$_4$ indicates the reaction product of aluminium with titanium tetrachloride, prepared as already described. The temperature given is the temperature at which the alkylation was carried out. The toluene conversion values are based on toluene alkylated. The yield of dialkyl benzene is based on the alkylating agent. Poly-alkyl benzenes included all products with more than two alkyl groups. The distribution of isomers in the dialkyl benzene products was obtained by infra-red spectroscopic analysis using as standards ortho- and meta-cymene which were synthesised from ortho- and meta-toluic acids according to the method of Brech (J. Amer. Chem. Soc., 1949, 71, 1362), and para-cymene obtained from limonene.

The product recovery procedures adopted in the examples were as follows:

*Procedure A.*—The reaction mixture was poured on to approximately 200 gms. of ice, and the organic liquid separated, washed successively with dilute sulphuric acid and a saturated solution of sodium bicarbonate, dried over magnesium sulphate, and distilled.

*Procedure B.*—The reaction mixture was filtered to remove the catalyst and the filtrate was distilled.

*Procedure C.*—The reaction mixture was shaken with 25 cc. of water until the organic layer was colourless. The latter was then separated, dried over magnesium sulphate and distilled.

*Procedure D.*—25 cc. of water were added to the reaction mixture which was then steam distilled. The organic layer in the distillate was separated and distilled.

TABLE 1

*Alkylation of Toluene With Propylene Using TiCl$_3$ as Catalyst*

| Example | Catalyst, gm.-moles | Toluene, gm.-moles | Propylene, gms. | Temp., °C. | Conv. tol., percent | Percent, cymenes | Percent, polyalkyl | Cymene distribution, wt. percent ||| Product recovery procedure |
|---|---|---|---|---|---|---|---|---|---|---|---|
| | | | | | | | | ortho | meta | para | |
| 1 | ¼ TiCl$_3$ | 3.5 | 44.0 | 75–80 | 37.3 | 52 | 16 | 44 | 18 | 38 | A. |
| 2 | ⅛ TiCl$_3$ | 3.5 | 42.0 | 75–80 | 32.0 | 46 | 15 | 45 | 18 | 37 | A. |
| 3 | 1/16 TiCl$_3$ | 3.5 | 43.0 | 75–80 | 33.3 | 43 | 25 | 42 | 23 | 35 | A. |
| 4 | 1/33 TiCl$_3$ | 3.5 | 44.5 | 75–80 | 40.3 | 51 | 21 | 44 | 20 | 36 | A. |
| 5 | 1/64 TiCl$_3$ | 3.5 | 18.0 | 75–80 | 41.0 | 20 | 7 | 42 | 23 | 35 | A. |
| 6 | 1/16 TiCl$_3$ | 3.5 | 43.0 | 75–80 | 18.3 | 69 | 35 | 45 | 17 | 38 | B. |
| 7 | 1/32 TiCl$_3$ | 3.5 | 42.0 | 75–80 | 24.3 | 64 | 24 | 43 | 19 | 38 | B. |
| 8 | 1/32 TiCl$_3$ | 3.5 | 38.0 | 110 | 36.3 | 51 | 14 | 46 | 23 | 31 | C. |

TABLE 2

*Alkylation of Toluene With Propylene Using Al—TiCl$_4$ as Catalyst*

| Example | Catalyst, gm.-moles | Toluene, gm.-moles | Propylene, gms. | Percent conv. tol. | Temp., C | Percent cymenes | Percent polyalkyl | Cymene distribution, wt. percent ||| Product recovery procedure |
|---|---|---|---|---|---|---|---|---|---|---|---|
| | | | | | | | | ortho | meta | para | |
| 9 | 1/16 Al-TiCl$_4$ | 3.5 | 42.0 | 36.3 | 75–80 | 34 | 17 | 41 | 26 | 33 | A. |
| 10 | 2/56 Al-TiCl$_4$ | 3.5 | 14.7 | 23.0 | 75–80 | 55 | 24 | 45 | 21 | 34 | B. |
| 11 | 1/32 Al-TiCl$_4$ | 3.5 | 53.4 | 31.0 | 75–80 | 60 | 22 | 46 | 21 | 33 | C. |
| 12 | 1/64 Al-TiCl$_4$ | 3.5 | 45.8 | 27.6 | 75–80 | 62 | 19 | 46 | 21 | 33 | C. |
| 13 | 1/128 Al-TiCl$_4$ | 3.5 | 49.3 | 37.6 | 75–80 | 48 | 21 | 45 | 21 | 33 | C. |
| 14 | 1/128 Al-TiCl$_4$ | 3.5 | 47.0 | 41.3 | 110 | 47 | 18 | 39 | 28 | 33 | C. |
| 15 | 1/128 Al-TiCl$_4$ | 3.5 | 42.5 | 26.3 | 75–80 | 54 | 23 | 45 | 24 | 31 | C. |
| 16 | 1/256 Al-TiCl$_4$ | 3.5 | 41.4 | 21.6 | 75–80 | 55 | 25 | 47 | 22 | 31 | C. |

TABLE 3

*Alkylation of Cumene by Propylene Using Al—TiCl$_4$*

| Example | Catalyst, gm.-moles | Cumene, gm.-moles | Propylene, gms. | Percent conv. cumene | Temp., °C. | Percent di-iso propyl benzene | Percent poly-alkyl benzenes | Di-isopropyl benzene distribution, percent ||| Product recovery procedure |
|---|---|---|---|---|---|---|---|---|---|---|---|
| | | | | | | | | Ortho | Meta | Para | |
| 17 | 1/32 Al-TiCl$_4$ | 3.5 | 42 | 25.7 | 75 | 56.3 | 37 | <16 | 38 | 46 | C. |
| 18 | 1/64 Al-TiCl$_4$ | 3.5 | 42 | 26.5 | 75 | 60 | 35 | <21 | 34 | 45 | C. |

TABLE 4
*Alkylation of Toluene With Isopropyl Chloride and Tert-Butyl Chloride*

| Example | Catalyst, gm.-moles | Alkylating agent, gm.-moles | Toluene, gm.-moles | Temp., °C. | Product | Percent poly-alkyls | Cymenes distribution, percent | | | Product recovery procedure |
|---|---|---|---|---|---|---|---|---|---|---|
| | | | | | | | Ortho | Meta | Para | |
| 19 | ⅛ Al-TiCl₄ | 0.5 iso-propyl chloride. | 2.0 | 25 | 44% cymenes | 14 | 36 | 33 | 31 | A. |
| 20 | ½ TiCl₃ | 0.5 tert. butyl chloride. | 2.0 | 25 | 25% tert. butyl toluene. | Nil | | | | A. |

TABLE 5
*Alkylation of Toluene With Propylene Using VCl₄, ZrCl₄, FeCl₃, AlCl₃ and TiCl₄ as Catalysts*

| Example | Catalyst, gm.-moles | Toluene, gm.-moles | Propylene, gm. | Tol. conv., percent | Temp., °C. | Percent cymenes | Percent polyalkyl | Cymenes distribution, wt. percent | | | Product recovery procedure |
|---|---|---|---|---|---|---|---|---|---|---|---|
| | | | | | | | | Ortho | Meta | Para | |
| 21 | ¾₀ VCl₄ | 3.5 | 14.0 | 22.6 | 75-80 | 15 | 4 | 41 | 18 | 40 | D. |
| 22 | ⅛ FeCl₃ | 3.5 | 12.0 | 29.0 | 75-80 | 14 | 5 | 49 | 16 | 35 | D. |
| 23 | ⅓ ZrCl₄ | 3.5 | 55.0 | 38.0 | 75-80 | 54 | 19 | 20 | 45 | 31 | D. |
| 24 | ¼ AlCl₃ | 7.0 | 84.0 | 35.0 | 50 | 41 | 22 | 3 | 66 | 33 | A. |
| 25 | ½ TiCl₄ | 3.6 | 42.0 | 50 | 70 | 20 | | 47 | 21 | 32 | A. |
| 26 | ⅛ TiCl₄ | 7.0 | 84.0 | | 40 | 9 | | 44 | 25 | 31 | A. |

It may be seen from the examples in Tables 1 to 4 inclusive that by the process of the present invention good yields of alkylated product are obtained in a distribution favourably directed to the more valuable ortho- and para-products. On the other hand the examples in Table 5 show that those known alkylation catalysts such as aluminium chloride which are reasonably active also give rise to considerable isomerisation to the less valuable meta product, and that those catalysts such as titanium tetrachloride yielding a product with more favourable isomer distribution are considerably less active.

I claim:
1. A process for the alkylaiton of an aromatic hydrocarbon which consists essentially in
    (1) reacting aluminum metal in finely divided form with a titanium tetrahalide at a temperature between about 100° C. and 250° C. in an inert hydrocarbon diluent and under a pressure sufficient to maintain the liquid phase under reflux conditions, and thereafter removing excess titanium tetrahalide from the reaction mixture and separating solid aluminum-titanium tetrahalide reaction product free from metallic aluminum; and then
    (2) contacting said aromatic hydrocarbon with an alkylating agent only in the presence of said aluminum-titanium tetrahalide reaction product, whereby said aromatic hydrocarbon is alkylated to form an alkylated aromatic hydrocarbon.
2. A process according to claim 1 in which the said tetrahalide is a tetrachloride and the said reaction is carried out at a temperature between 100° C. and the boiling point at atmospheric pressure of titanium tetrachloride.
3. A process according to claim 1 in which the said reaction is carried out in the presence of an additive selected from the group consisting of boron chloride and aluminum chloride.
4. A process according to claim 3 in which the said additive is freshly distilled.
5. A process, according to claim 3, in which said additive is freshly sublimed.
6. A process according to claim 1 in which the said alkylating agent is selected from the group consisting of an olefine and an alkyl halide.
7. A process according to claim 6 in which the alkylation is carried out at a temperature up to 120° C.
8. A process according to claim 7 in which the alkylating agent is an olefine and the alkylation is carried out at a temperature between 70° C. and 110° C.
9. A process according to claim 6 in which the alkylating agent is an alkyl halide and the alkylation is carried out at a temperature up to 40° C.
10. A process according to claim 1 in which the alkylating agent is a propylating agent.
11. A process according to claim 10 in which the alkylating agent is propylene.
12. A process according to claim 1 in which the alkylation is carried out in the presence of an inert diluent.
13. A process according to claim 1 in which the said aromatic compound is brought into contact with the alkylating agent under substantially anhydrous conditions.
14. A process according to claim 1 in wihch the said aromatic compound comprises a mono-alkyl benzene.
15. A process according to claim 14 in which the said aromatic compound is selected from the group consisting of cumene and toluene.
16. A process according to claim 1 in which the molar concentration of the catalyst relative to the aromatic compound is between 0.01 and 0.5.

References Cited in the file of this patent
UNITED STATES PATENTS

| | | |
|---|---|---|
| 2,141,593 | Clarke et al. | Dec. 27, 1938 |
| 2,824,145 | McCall et al. | Feb. 18, 1958 |
| 2,849,505 | Schmerling | Aug. 26, 1958 |
| 2,899,413 | Hagemeyer et al. | Aug. 11, 1959 |
| 3,077,909 | Raecke | Nov. 7, 1961 |

OTHER REFERENCES
Callaway: Chem. Rev., 17, p. 375 relied on, 1935.